March 5, 1946.  J. C. OWENS  2,395,906
ANTISIPHONIC PLUMBING UNIT
Filed Dec. 12, 1942
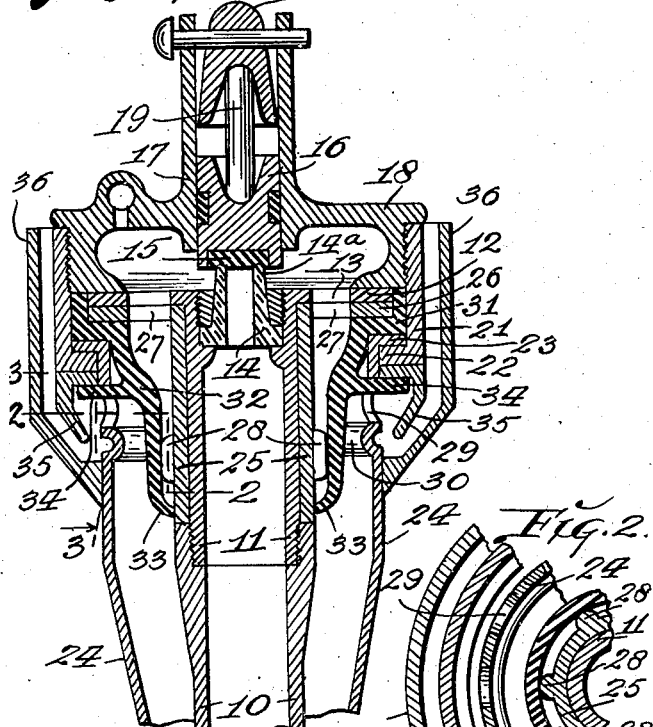
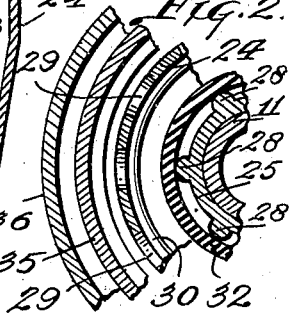
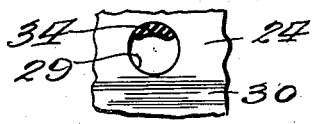
INVENTOR.
JESSE C. OWENS
BY
ATTY Patented Mar. 5, 1946

2,395,906

UNITED STATES PATENT OFFICE 2,395,906

ANTISIPHONIC PLUMBING UNIT

Jesse C. Owens, Los Angeles, Calif.

Application December 12, 1942, Serial No. 468,791

5 Claims. (Cl. 137—69)

My invention relates to an anti-siphonic unit for plumbing fixtures, particularly, the ball cock valves and silencers of toilet tanks, and the principal objects of my invention are to provide a relatively simple, practical and inexpensive anti-siphonic unit which may be constructed from plastics, or other non-corrodible materials, and further, to generally improve upon and simplify the construction of the valve covered by United States Letters Patent #2,290,145 issued to me July 14, 1942, also U. S. Letters Patent, #2,329,-337 issued to Loren E. Criss and myself September 14, 1943.

A further object of my invention is to provide an anti-siphonic unit, which, in addition to being particularly applicable for use in connection with the ball cock valves of toilet tanks, may be utilized with equal advantage in any plumbing fixture or structure for controlling the flow of water through the structure, and at the same time, to automatically counteract suction due to siphonic action from drawing contaminated water through the structure to pollute the water supply from the main to which the fixture is connected.

A further object of my invention is to provide a relatively simple, practical and efficient valvular member composed of rubber, either natural or synthetic, and which may be readily combined with ball cock valves, and like plumbing structures, and which will act automatically to permit flow of liquid through the ball cock of the other fixture, and which also permits air to enter the ball cock or other structure for the purpose of counteracting suction produced by siphonic action.

With the foregoing and other objects in view, my invention consists in certain novel features of construction and arrangement of parts, which will be hereinafter more fully described and claimed, and illustrated in the accompanying drawing, in which:

Fig. 1 is a vertical section taken through the center of a ball cock and showing my improved anti-siphonic unit associated therewith.

Fig. 2 is a horizontal section taken approximately on the line 2—2 of Fig. 1.

Fig. 3 is an elevational view taken on the line 3—3 of Fig. 1.

Referring by numerals to the accompanying drawing, 10 designates a tube having its lower end secured to the bottom of the flushing tank and which is connected to a supply main for delivering flushing water to the tank through a float controlled ball cock.

Detachably connected to the upper end of said tube is an extension 11, provided at its end with an outwardly projecting flange 12, in which is formed a circular row of apertures 13.

Suitably secured with the upper portion of extension tube 11 is a short upwardly projecting tube 14, of porcelain, glass or the like and the upper end of this tube provides a seat 14ª, for a packing disc 15, of leather, rubber or the like that is seated in the lower end of a piston valve 16.

This piston valve is arranged for operation in a short vertically disposed cylinder 17 that is formed in the center of a valve housing cap 18. Valve 16 is normally maintained on its seat by a toggle pin 19 that is positioned between said valve and a pivoted float carrying head 20, as more fully disclosed in patent No. 2,329,337, above referred to.

The wall of cap 18 is screw-seated in the upper portion of a coupling collar 21, the latter having at its lower end, an inwardly projecting flange 22 that engages beneath a flange 23 which projects outwardly from the upper end of a hush tube 24, and the latter surrounding and being spaced apart from, water inlet tube 10.

Surrounding extension tube 11 is a tube 25, and extending outwardly from the upper end thereof is a flange 26, that lies against the underside of flange 12 and said flange 26 having apertures 27 which coincide with apertures 13.

The lower wall of cap 18 bears directly upon the outer portion of flange 12. Formed on the lower portion of the outer face of tube 25 is a circumferential row of spacing lugs 28.

Formed through the wall of hush tube 24 a short distance below flange 23, is a circumferential row of apertures 29 and, projecting inwardly from said hush tube just below said apertures, is a circumferential rib 30.

Within collar 21, between the flange 23 and flanges 26 and 12 is the flanged upper end 31, of a substantially tubular member 32 of natural or synthetic rubber and which in certain respects performs the functions of a check valve.

The lower portion of member 32 is somewhat smaller in diameter than the upper portion and the wall of said lower portion gradually decreases in thickness toward its lower end and the latter being curved inwardly so as to bear against the surface of tube 25, below spacing lugs 28.

The immediate portion of tube 32 occupies a concentric position between tube 25 and the upper portion of hush tube 24 and formed integral with this intermediate portion, is a series of outwardly projecting lugs 34 which extend through the upper portions of apertures 29.

The projecting ends of lugs 34 provide a support for a guard ring 35, which is substantially of inverted L-shape in cross section and the depending wall of this ring occupies a position a short distance outwardly from the apertures 29 with the lower end of said ring terminating in the same horizontal plane with rib 30. Ring 35 is made separate and mounted on lugs 34 in order to facilitate assembly and disassembly of the various parts of the valve and when in proper position, said ring serves as a baffle for air flowing through the space between collar 21 and surrounding tube 36, also through the apertures 29. Rib 30 acts as a stop to limit outward movement of elastic member 32 when expanded outward by pressure of water passing through the valve.

Rigidly secured to hush tube 24, just below rib 30 is the inwardly turned lower end of a tube 36 which surrounds and is spaced apart from coupling collar 21 and guard ring 35.

Under normal conditions, packing disc 15 resting on seat 14ᵃ prevents the flow of water from tube 10 into the valve chamber below cap 18 and as the lower end 33 of member 32 bears against tubular member 25 below spacing lugs 28, it is impossible for air to pass into the valve chamber within member 32, and below cap 18.

When valve 16 moves off its seat 14ᵃ as a result of the lowering of the float in the tank, water under pressure from the main discharges through tubular member 14 into the valve chamber, thence downwardly through apertures 13 and 27, thence downwardly through the space between tube 25 and elastic member 32 and the pressure of this water will flex the tapered lower end 33 of said member 32 outwardly, thereby permitting water to flow downwardly between tube 10 and the hush and discharge from the lower end of the latter into the tank.

Should siphonic conditions develop in the supply tube and tend to draw water from the tank and bowl backwardly through the supply tube, air entering apertures 29 and flowing downward through the space between tube 10 and hush tube, will counteract and break such siphonic conditions and thereby prevent contamination of water in the supply main.

It is to be noted that in my improved construction, water entering the valve chamber, beneath cap 18, flows directly downward through apertures 13 and 27 and thence downward through the annular space between the wall of resilient member 32 and tube 25 to the space between tube 10 and hush tube 24.

The flow of water downwardly around tube 10, is highly effective in counteracting the hissing and gurgling noises which usually attend the flow of water under pressure from the supply pipe to and through the valve housing. By producing all parts of my improved valve, with the exception of the valve seat member 14, from plastic substances or the like, the undesirable results of corrosion, which usually attend the use of metal, that is constantly subjected to moisture is eliminated.

In the modified construction illustrated in Figs. 4 and 5, the lower end of a water supply tube 40 is connected by conventional means to the bottom of a flush tank T and the upper end of said tube, which gradually increases in diameter toward its upper end, has secured thereon by cement or otherwise, a cup-shaped member 41, in the upper portion of the wall of which is formed a circumferential row of apertures 42.

Formed on the outer face of the wall of member 41 between apertures 42, are spacing lugs 43. A piston valve 44, operated by a float within the tank and practically identical in construction and operation with valve 16 and illustrated in Fig. 1, normally rests on a seat 45 to close the flow of water from tube 40 into the chamber within cup 41. This piston valve operates within a cylinder 46 that is formed by a portion of tube 40 and formed through the wall of this cylinder just below seat 45 and within member 41, is a circumferential row of apertures 46ᵃ.

Secured to the upper portion of cylinder 46 by cement or otherwise is a cover cap 47, having a depending marginal flange 48. The flaring upper end 49ᵃ of a hush tube 50, is secured to the underside of cap 47 and extends downward around and spaced apart from tube 40. Lugs 50ᵃ maintain the hush tube in spaced relation relative to tube 40. Formed through the upper flaring portion 49ᵃ of the wall of hush tube 50 behind the depending wall 48 of cap 47 is a series of air inlet apertures 49ᵇ.

Secured to the underface of cap 47 around cylinder 46 is the flanged top of a ring-shaped member 51 of natural or synthetic rubber, the wall of which extends downward in the space between cup 41 and the upper portion of the hush tube. The wall of member 51, which gradually decreases in thickness toward its lower end, normally rests against the lugs 43 and the thin lower end of said wall is curved inwardly as designated by 52 and bears against the wall of cup 41 below the apertures 43 therein.

At the top of member 49 an integral extension is provided with a duct 53, which leads to the refill tube (not shown) and said duct is connected by a short duct 54, to the chamber between cylinder 46 and resilient ring 51.

Ring 71 is made separate and supported by lugs 70 in order to simplify construction and also enabling the parts to be readily assembled and taken apart.

Where the parts of my improved anti-siphonic unit are formed of plastics or analogous, non-corrodible material, said parts may be rigidly connected by the use of acetone or with a suitable waterproof cement.

Thus it will be seen that I have provided an anti-siphonic unit for plumbing fixtures and appliances, that is simple in structure, inexpensive of manufacture and very effective in performing the functions for which it is intended.

It will be understood that minor changes in the size, form and construction of the various parts of my improved anti-siphonic unit may be made and substituted for those herein shown and described without departing from the spirit of the invention, the scope of which is set forth in the appended claims.

I claim as my invention:

1. The combination with a vertically disposed duct of a valve housing located on the upper end of said duct, valvular means for controlling the discharge of liquid from said duct into said valve housing, a tube communicating with said housing and concentrically disposed about said duct and spaced apart therefrom, a substantially tubular member formed of resilient material located between the upper portion of said duct and said concentric tube with the intermediate portion of said tubular member spaced apart from said duct and said tube and with the lower end of said resilient member normally bearing on said duct and means for maintaining that portion of the resilient tube above the lower end thereof, in spaced relation relative to said duct.

2. An anti-siphonic plumbing unit as set forth in claim 1 wherein the upper portion of said resilient member is secured to said valve housing.

3. An anti-siphonic plumbing unit as set forth in claim 1 and with means for admitting air to the space between said duct and concentric tube at a point above the lower end of said resilient member.

4. An anti-siphonic plumbing unit as set forth in claim 1 with means for admitting air to the space between said duct and concentric tube at a point above the lower end of said resilient member and a guard for said air admission means.

5. An anti-siphonic plumbing unit as set forth in claim 1 with said concentrically disposed tube provided with air admission openings communicating with the space between the lower portion of said resilient tubular member and said concentrically disposed tube, lugs projecting from said resilient member through said air admission openings and a deflector supported by said lugs and disposed outwardly from said admission openings.

JESSE C. OWENS.